US009973525B1

(12) United States Patent
Roturier et al.

(10) Patent No.: US 9,973,525 B1
(45) Date of Patent: May 15, 2018

(54) SYSTEMS AND METHODS FOR DETERMINING THE RISK OF INFORMATION LEAKS FROM CLOUD-BASED SERVICES

(71) Applicant: Symantec Corporation, Mountain View, CA (US)

(72) Inventors: Johann Roturier, Kildare (IE); David Silva, Sandyford (IE)

(73) Assignee: Symantec Corporation, Mountain View, CA (US)

( * ) Notice: Subject to any disclaimer, the term of this patent is extended or adjusted under 35 U.S.C. 154(b) by 217 days.

(21) Appl. No.: 15/182,101

(22) Filed: Jun. 14, 2016

(51) Int. Cl.
  *H04L 29/06* (2006.01)
  *G06F 21/60* (2013.01)

(52) U.S. Cl.
  CPC ........ *H04L 63/1433* (2013.01); *G06F 21/602* (2013.01)

(58) Field of Classification Search
  CPC ........................... H04L 63/1433; G06F 21/602
  See application file for complete search history.

(56) References Cited

U.S. PATENT DOCUMENTS

| 8,978,092 B2 | 3/2015 | Balinsky et al. |
| 2009/0198707 A1 | 8/2009 | Rohner |
| 2012/0311703 A1 | 12/2012 | Yanovsky et al. |
| 2013/0232543 A1 | 9/2013 | Cheng et al. |
| 2013/0340089 A1 | 12/2013 | Steinberg et al. |
| 2015/0100527 A1 | 4/2015 | Ryan |
| 2015/0261940 A1 | 9/2015 | Roundy |
| 2016/0182556 A1* | 6/2016 | Tatourian ............... G06F 21/554 726/25 |

OTHER PUBLICATIONS

Chou SC. Controlling information flows in SaaS cloud services. In Computing and Convergence Technology (ICCCT), 2012 7th International Conference on Dec. 3, 2012 (pp. 651-656). IEEE. (Year: 2012).*

Comprehensive Security-as-a-Service (SaaS)—a single, integrated suite with all the benefits of email, endpoint, and web protection solutions, 2014, 4 pages, by Prime Care Technologies (Year: 2014).*

(Continued)

*Primary Examiner* — Oleg Korsak
(74) *Attorney, Agent, or Firm* — FisherBroyles, LLP (57) ABSTRACT

The disclosed computer-implemented method for determining the risk of information leaks from cloud-based services may include (1) identifying a cloud-based service that provides remote software-services to client organizations, (2) extracting, from a publicly accessible page of the cloud-based service, a list of customers that use the cloud-based service, (3) retrieving, for each customer in the list of customers, at least one link to a customer page on the cloud-based service that represents a method for the customer to access the remote software-services offered by the cloud-based service, (4) analyzing each identified customer page for at least one risk factor, and (5) calculating, based on the analysis, a risk score for the service that represents an overall estimation of security risks to client organizations that utilize the cloud-based service. Various other methods, systems, and computer-readable media are also disclosed.

20 Claims, 7 Drawing Sheets

(56) References Cited

OTHER PUBLICATIONS

Integrated Data Loss Prevention, 2 pages, 2005, by Trend Micro™ (Year: 2005).*
Spillage and Cloud Computing, 24 pages, Feb. 14, 2013, by the U.S. Department of Homeland Security (Year: 2013).*
Indian Security Products Countering Cyber Risks, 36 pages, Apr. 25, 2016, by NASSCOM (Year: 2016).*
Recommendations for companies planning to use Cloud computing services, 21 pages, 2012, by CNiL (Year: 2012).*
Starov et al. (Are You Sure You Want to Contact Us? Quantifying the Leakage of PII via Website Contact Forms, 14 pages, Sep. 8, 2015) (Year: 2015).*
Johann Roturier, et al; Systems and Methods for Preventing Data Loss Through Internet-Based Systems; U.S. Appl. No. 15/181,467, filed Jun. 14, 2016.
Kevin Alejandro Roundy, et al.; Systems and Methods for Determining Whether Confidential Project Data Has Been Leaked; U.S. Appl. No. 14/969,620, filed Dec. 15, 2015.
Kevin Alejandro Roundy, et al; Systems and Methods for Detecting Information Leakage by an Organizational Insider; U.S. Appl. No. 14/262,471, filed Apr. 25, 2014.
Maltego, https://www.paterva.com/web7/, as accessed Apr. 22, 16, Paterva, (On or before Apr. 22, 2016).
BitSight, https://www.bitsighttech.com/, as accessed Apr. 22, 2016, BitSight Technologies, (Jun. 25, 2011).
SecurityScorecard, https://securityscorecard.com/, as accessed Apr. 22, 2016, (Feb. 28, 2004).
Skybox, https://www.skyboxsecurity.com/solutions/attack-surface-visibility, as accessed Apr. 22, 2016, Skybox Security, Inc., (On or before Apr. 22, 2016).
Quad Metrics, https://www.quadmetrics.com/solutions/cyber_insurance_data, as accessed Apr. 22, 2016, (On or before Apr. 22, 2016).
Customers, http://www.workday.com/customers.php, as accessed Apr. 22, 2016, Workday, Inc. (On or before Apr. 22, 2016).
Andra Zaharia, 10+ Critical Corporate Cyber Security Risks—A Data Driven List [Updated], https://heimdalsecurity.com/blog/10-critical-corporate-cyber-security-risks-a-data-driven-list/, as accessed Apr. 22, 2016, Heimdal Security, (Mar. 21, 2015).
Yang Liu et al., Predicting Cyber Security Incidents Using Feature-Based Characterization of Network-Level Malicious Activities, http://www-personal.umich.edu/~youngliu/pub/iwspa01-liu.pdf, IWSPA '15 Proceedings of the 2015 ACM International Workshop on International Workshop on Security and Privacy Analytics, (Mar. 4, 2015).
Yang Liu et al., Cloudy with a Chance of Breach: Forecasting Cyber Security Incidents, https://www.usenix.org/system/files/conference/usenixsecurity15/sec15-paper-liu.pdf, Proceedings of the 24th USENIX Security Symposium, USENIX Association, (Aug. 12-14, 2015).
ZeroFOX, https://www.zerofox.com/, as accessed Apr. 22, 2016, (May 15, 2007).
RiskIQ, https://www.riskiq.com/, as accessed Apr. 22, 2016, (Nov. 30, 2001).
Matchlight, https://terbiumlabs.com/matchlight.html, as accessed Apr. 22, 2016, Terbium Labs, (On or before Apr. 22, 2016).
Digital Shadows, https://www.digitalshadows.com/, as accessed Apr. 22, 2016, (Jan. 19, 2002).
Kevin Borders et al., Quantifying Information Leaks in Outbound Web Traffic, http://www-personal.umich.edu/~kborders/leaks.pdf, 2009 30th IEEE Symposium on Security and Privacy, (May 17-20, 2009).
Nilangi Mane et al., Detection of guilty agents by maintaining the confidentiality of the data on the web, http://ieeexplore.ieee.org/document/7002395/, 2014 International Conference on Advances in Electronics, Computers and Communications (ICAECC), (Oct. 10-14, 2014).
"Presidential Memorandum—National Insider Threat Policy and Minimum Standards for Executive Branch Insider Threat Programs", www.whitehouse.gov/the-press-office/2012/11/21/presidential-memorandum-national-insider-threat-policy-and-minimum-stand, as accessed Feb. 6, 2014, The White House, Office of the Press Secretary, (Nov. 21, 2012).
Senator, Ted E., et al., "Detecting Insider Threats in a Real Corporate Database of Computer Usage Activity", http://www.cc.gatech.edu/~bader/papers/PRODIGAL-KDD2013.pdf, as accessed Feb. 6, 2014, KDD'13, ACM, Chicago, Illinois, (Aug. 11-14, 2013).
Comstock, Courtney, "The Dark Side of Expert Networks: 20 Ways Corporate Spies Get Information", http://www.businessinsider.com/how-expert-networks-get-information-to-give-clients, as accessed Feb. 6, 2014, Business Insider, Inc., (Nov. 29, 2010).
"Corporate Breach Protection", http://www.tiversa.com/solutions/enterprise/Corporate-Breach-Protection/, as accessed Oct. 30, 2015, Tiversa, (Nov. 11, 2011).
Kyzer, Lindy, "Job Seekers Leak NSA Program Names on LinkedIn", https://news.clearancejobs.com/2013/06/19/job-seekers-leak-nsa-program-names-on-linkedin/, as accessed Oct. 30, 2015, ClearanceJobs, (Jun. 19, 2013).
"Tiversa", http://www.tiversa.com/, as accessed Oct. 30, 2015, (May 17, 2003).

\* cited by examiner

SYSTEMS AND METHODS FOR DETERMINING THE RISK OF INFORMATION LEAKS FROM CLOUD-BASED SERVICES

BACKGROUND

Individuals and organizations increasingly utilize software and services that are accessed over a network. These cloud-based services provide a wide range of functions ranging from human resources management to file storage and sharing, and may accordingly handle a variety of sensitive information. Each service may maintain customized login and/or access pages for each customer, and these access pages may contain various elements that may inadvertently reveal information about the customer organization. For example, while various portions of the systems accessed through the login and/or access pages may be inaccessible to individuals and organizations outside of the customer organization represented by the access page, information about the customer organization, the page, and/or relevant systems may be inferred or even outright exposed on public-facing pages managed by the cloud-based service.

Unfortunately, traditional methods for assessing risk of information leaks may fail to account for the wide variety of cloud-based services that are available. Traditional methods that attempt to account for a wide variety of cloud-based services may rely on traditional Internet search techniques and thus may fail to appropriately target their searches. Such failure to appropriately target searches may cause these methods to be costly and/or time-consuming to execute. The instant disclosure therefore identifies and addresses a need for improved systems and methods for determining the risk of information leaks from cloud-based services.

SUMMARY

As will be described in greater detail below, the instant disclosure describes various systems and methods for determining the risk of information leaks from cloud-based services by calculating overall risk scores for various service providers based on risk factors associated with customer pages managed by each service provider. These risk scores may inform clients and/or administrators of which services are likely to provide safer services. Additionally or alternatively, the systems and methods described herein may calculate a risk score for a particular customer based on risk factors of publicly accessible pages associated with the customer, thus allowing the customer to track an overall estimation of the security of their online presence.

In one example, a computer-implemented method for determining the risk of information leaks from cloud-based services may include (1) identifying a cloud-based service that provides remote software-services to client organizations, (2) extracting, from a publicly accessible page of the cloud-based service, a list of customers that use the cloud-based service, (3) retrieving, for each customer in the list of customers, at least one link to a customer page on the cloud-based service that represents a method for the customer to access the remote software-services offered by the cloud-based service, (4) analyzing each identified customer page for at least one risk factor, and (5) calculating, based on the analysis, a risk score for the service that represents an overall estimation of security risks to client organizations that utilize the cloud-based service. Risk factors analyzed may include a telephone number, an e-mail address, a link to an additional customer page that represents an additional method for the customer to access additional remote software-services offered by the cloud-based service, a link to an alternate customer page on an additional cloud-based service, information that has been determined to be sensitive by the customer associated with the customer page, and/or a form of encryption used by the customer page.

The computer-implemented method may include retrieving the link to the customer page in a variety of ways. In some examples, retrieving the link to the customer page may include identifying an organization-specific subdomain of the cloud-based service. Furthermore, the computer-implemented method may include identifying the cloud-based service in a variety of ways. For example, identifying the cloud-based service may include searching a public page of a client organization, then determining that the public page of the client organization includes a link to a subdomain of the cloud-based service and/or an endorsement of the cloud-based service.

The above-described method may analyze various portions of the customer page. For example, analyzing the customer page for risk factors may include retrieving a hypertext transfer protocol (HTTP) header associated with the customer page and analyzing the hypertext transfer protocol header for risk factors.

The computer-implemented method may include updating risk scores after a period of time. For example, the computer-implemented method may include, at a subsequent point in time, (1) retrieving, for each customer in the list of customers, links to customer pages on the cloud-based service, (2) performing a subsequent analysis of each identified customer page for risk factors, and (3) updating, based on the subsequent analysis, the risk score for the service.

Additionally or alternatively, the computer-implemented method may further include, for a particular customer of the cloud-based service, (1) identifying additional cloud-based services that provide additional remote software-services to the customer, (2) for each identified additional cloud-based service, analyzing additional customer pages that represents methods for the customer to access the additional remote software-services offered by the additional cloud-based services, and (3) calculating, for the customer of the cloud-based services, a unified customer risk score that represents an overall estimation of security risks to the customer across each of the cloud-based services. In some embodiments, the unified customer risk score may be based on a combination of: the total quantity of risk factors identified on customer pages associated with the customer and the number of cloud-based services that host at least one customer page associated with the customer.

In some embodiments, the computer-implemented method may further include performing a security action based on the risk score satisfying a predetermined threshold. This security action may include notifying an administrator of the cloud-based service that the risk score satisfied the predetermined threshold and/or preventing access to at least one customer page on the cloud-based service.

In one embodiment, a system for implementing the above-described method may include (1) an identification module, stored in memory, that identifies a cloud-based service that provides remote software-services to client organizations, (2) an extracting module, stored in memory, that extracts, from a publicly accessible page of the cloud-based service, a list of customers that use the cloud-based service, (3) a retrieving module, stored in memory, that retrieves, for each customer in the list of customers, at least one link to a customer page on the cloud-based service that represents a method for the customer to access the remote software-services offered by the cloud-based service, (4) an analyzing module, stored in memory, that analyzes each identified customer page for at least one risk factor, (5) a calculating module, stored in memory, that calculates, based on the analysis, a risk score for the service that represents an overall estimation of security risks to client organizations that utilize the cloud-based service, and (6) at least one physical processor configured to execute the identification module, the extracting module, the retrieving module, the analyzing module, and the calculating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a cloud-based service that provides remote software-services to client organizations, (2) extract, from a publicly accessible page of the cloud-based service, a list of customers that use the cloud-based service, (3) retrieve, for each customer in the list of customers, at least one link to a customer page on the cloud-based service that represents a method for the customer to access the remote software-services offered by the cloud-based service, (4) analyze each identified customer page for at least one risk factor, and (5) calculate, based on the analysis, a risk score for the service that represents an overall estimation of security risks to client organizations that utilize the cloud-based service.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for determining the risk of information leaks from cloud-based services. Organizations may utilize cloud-based services to manage information that they desire to keep private from the general public. As will be explained in greater detail below, the systems and methods described herein may identify and analyze publicly-accessible pages of cloud-based services for a variety of risk factors, thereby enabling client organizations and cloud-based service providers to efficiently identify and track the likelihood of information leaks through the cloud-based services.

Figure 1:
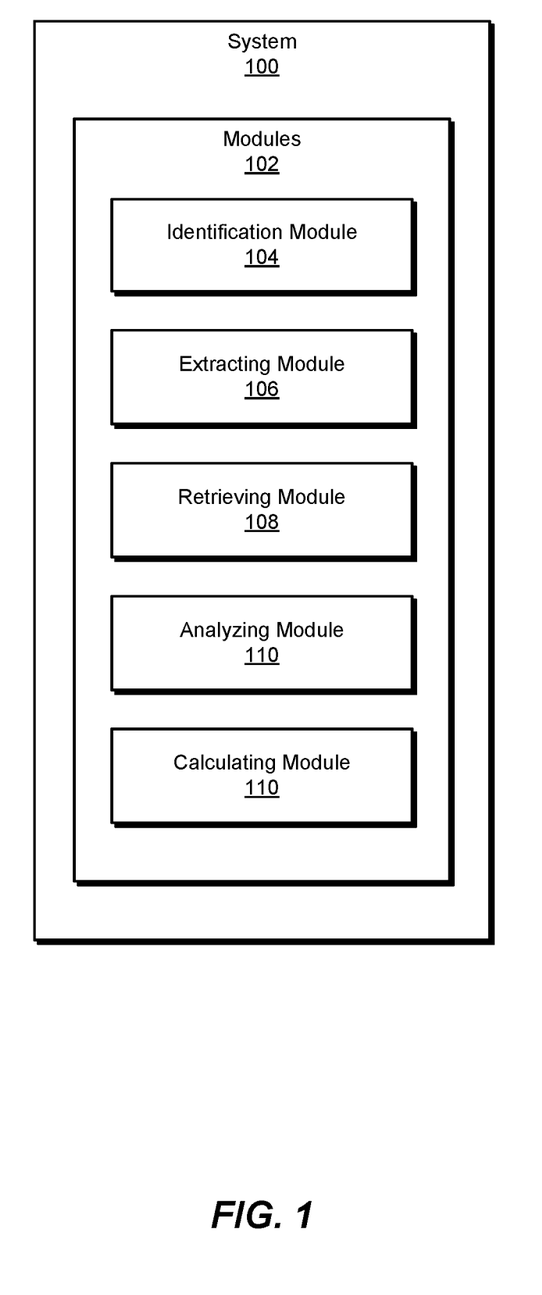
FIG. 1 is a block diagram of an example system for determining the risk of information leaks from cloud-based services.
Figure 2:
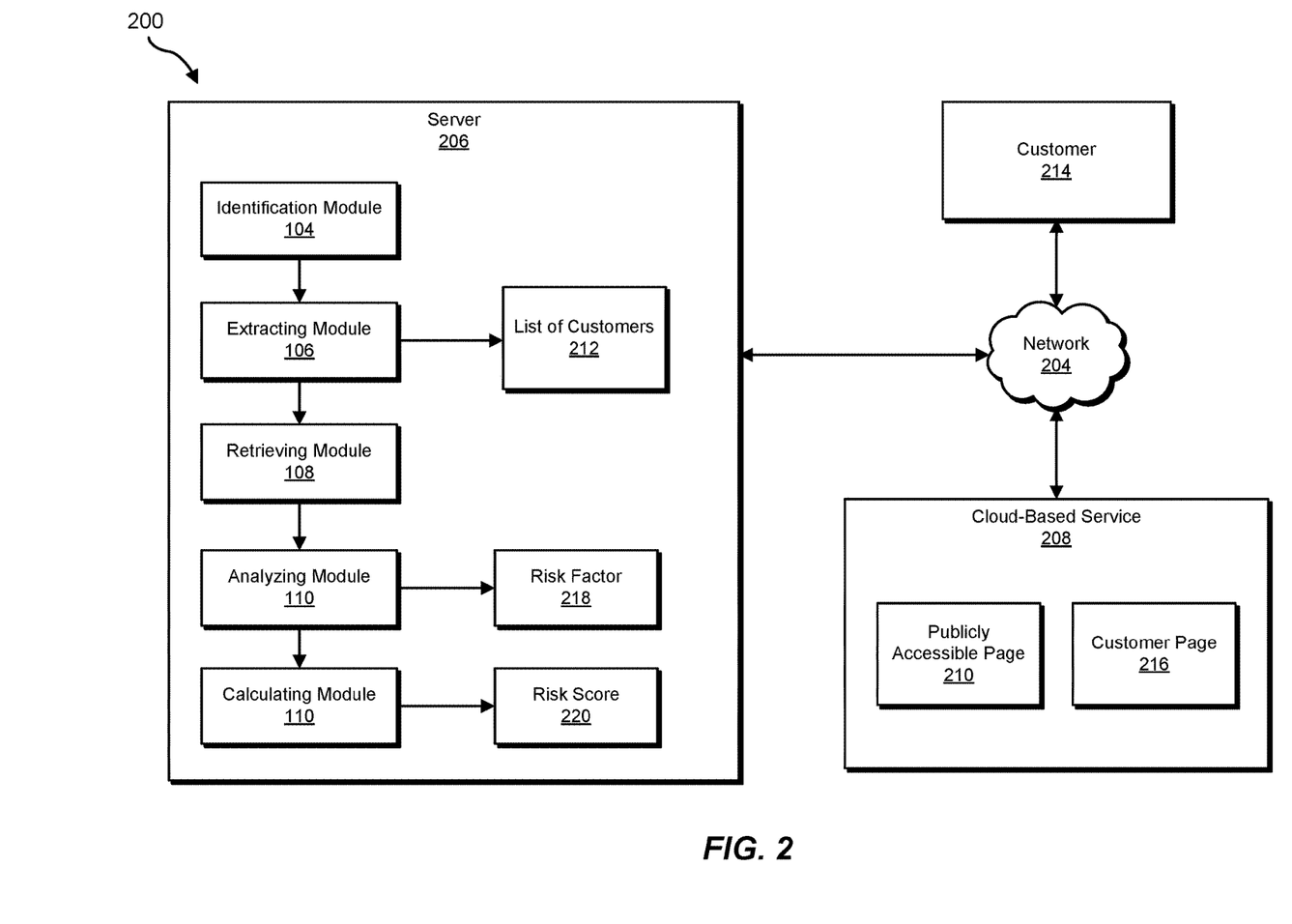
FIG. 2 is a block diagram of an additional example system for determining the risk of information leaks from cloud-based services.

The following will provide, with reference to FIGS. 1-2, detailed descriptions of example systems for determining the risk of information leaks from cloud-based services. Detailed descriptions of corresponding computer-implemented methods will also be provided in connection with FIG. 3. Detailed descriptions of an example cloud-based service will be provided in connection with FIG. 4, and detailed descriptions of further example systems for determining the risk of information leaks will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of example system 100 for determining the risk of information leaks from cloud-based services. As illustrated in this figure, example system 100 may include one or more modules 102 for performing one or more tasks. For example, and as will be explained in greater detail below, system 100 may include an identification module 104 that identifies a cloud-based service that provides remote software-services to client organizations. Example system 100 may additionally include an extracting module 106 that extracts, from a publicly accessible page of the cloud-based service, a list of customers that use the cloud-based service. Example system 100 may also include a retrieving module 108 that retrieves, for each customer in the list of customers, at least one link to a customer page on the cloud-based service that represents a method for the customer to access the remote software-services offered by the cloud-based service. Furthermore, example system 100 may include an analyzing module 110 that analyzes each identified customer page for at least one risk factor. Moreover, example system 100 may include a calculating module 112 that calculates, based on the analysis, a risk score for the service that represents an overall estimation of security risks to client organizations that utilize the cloud-based service. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks.

For example, and as will be described in greater detail below, one or more of modules 102 may represent software modules stored and configured to run on one or more computing devices, such as the devices illustrated in FIG. 2 (e.g., server 206), computing system 610 in FIG. 6, and/or portions of example network architecture 700 in FIG. 7. One or more of modules 102 in FIG. 1 may also represent all or portions of one or more special-purpose computers configured to perform one or more tasks.

Example system 100 in FIG. 1 may be implemented in a variety of ways. For example, all or a portion of system 100 may represent portions of example system 200 in FIG. 2. As shown in FIG. 2, system 200 may include a server 206 in communication with a cloud-based service 208 via a network 204. Server 206 may be programmed with one or more of modules 102.

In one embodiment, one or more of modules 102 from FIG. 1 may, when executed by at least one processor of server 206, enable server 206 to analyze cloud-based services to determine if the cloud-based service is likely to leak sensitive data owned by client organizations. For example, and as will be described in greater detail below, one or more of modules 102 may cause server 206 to evaluate the risk of information leaks from cloud-based services. For example, and as will be described in greater detail below, identification module 104 may identify a cloud-based service 208 that provides remote software-services to client organizations. Extracting module 106 may extract, from a publicly accessible page 210 of cloud-based service 208, a list of customers 212 that use cloud-based service 208. Retrieving module 108 may retrieve, for each customer in list of customers 212 (e.g., customer 214), at least one link to a customer page (e.g., customer page 216) on cloud-based service 208 that represents a method for the customer to access the remote software-services offered by cloud-based service 208. Analyzing module 110 may analyze each identified customer page for at least one risk factor, such as risk factor 218. Calculating module 112 may calculate, based on the analysis, a risk score 220 for cloud-based service 208 that represents an overall estimation of security risks to client organizations that utilize cloud-based service 208.

Server 206 generally represents any type or form of computing device that is capable of searching for and analyzing publicly accessible pages of cloud-based services. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), network architecture 700 in FIG. 7, or the like. Network 204 may facilitate communication or data transfer using wireless or wired connections. In one embodiment, network 204 may facilitate communication between server 206 and cloud-based service 208.

Cloud-based service 208 generally represents any form of digital service that is provided to clients over a network. Cloud-based services may take a variety of forms, including social media platforms, file storage, human resources management, etc. and generally have a specific page associated with each client, such as customer page 216 in FIG. 2. This specific page may serve as a portal for clients to access secure features and/or data managed by the cloud-based service. Some specific examples of cloud-based services include, without limitation, SERVICE-NOW, WORKDAY, and BOX.COM.

Risk factor 218 generally represents any form of information that may be used as part of illegitimately accessing sensitive data owned by customer 214. In other words, risk factor 218 represents publicly available facts about customer 214 that, alone or in combination, may present a security risk to customer 214. For example, an employee phone number and/or e-mail address present on customer page 216 may enable an attacker to construct a phishing attack in an attempt to compromise systems operated by customer 214. As an additional example, a login page that uses weak or no encryption during an authentication process may put employee usernames and passwords at risk for theft. Risk factor 218 may be present in a variety of locations on a page, such as in the page content, page metadata, content metadata, return codes (e.g., a hypertext transfer protocol/HTTP 200 code), etc.

Figure 3:
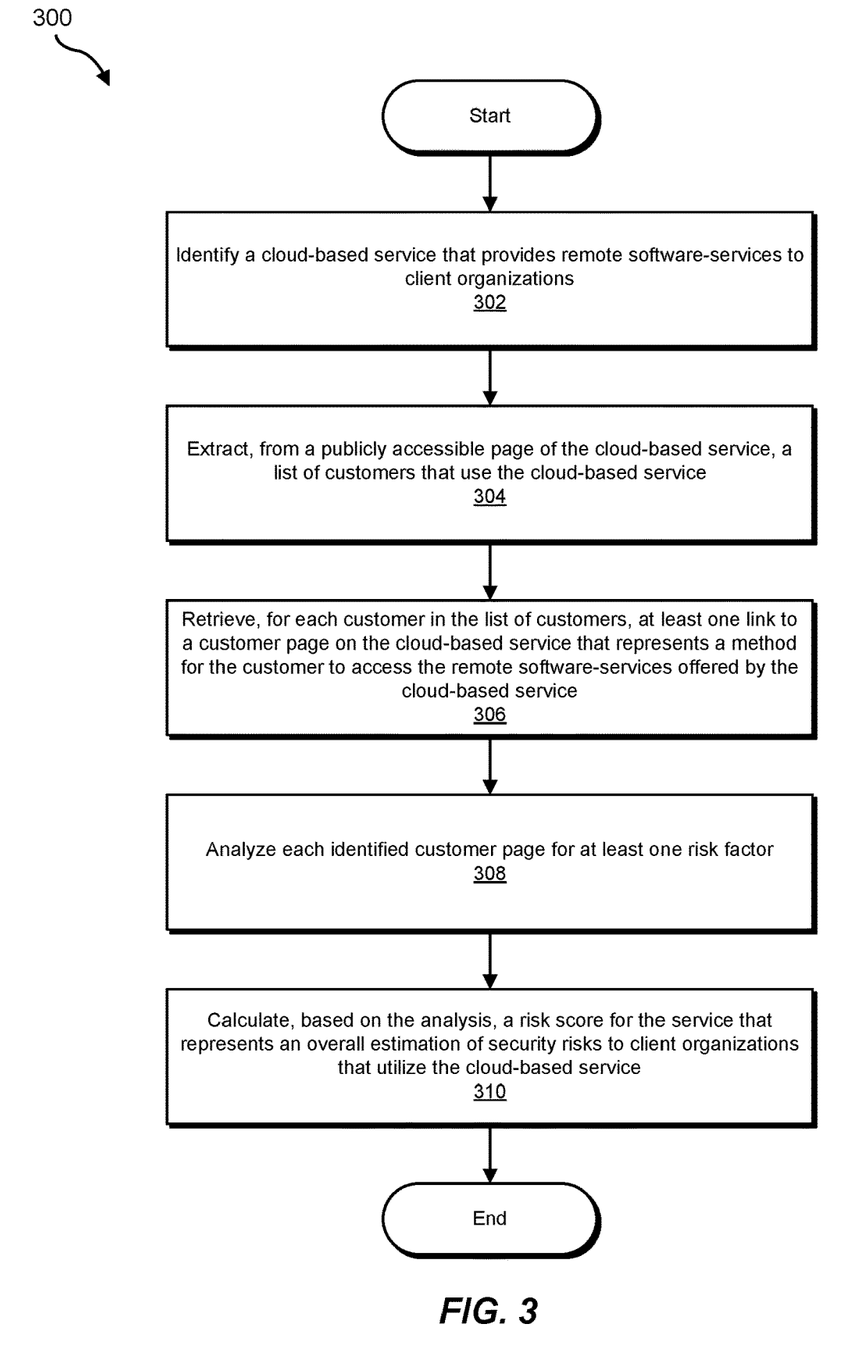
FIG. 3 is a flow diagram of an example method for determining the risk of information leaks from cloud-based services.

FIG. 3 is a flow diagram of a computer-implemented method 300 for determining the risk of information leaks from cloud-based services. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of network architecture 700 in FIG. 7.

As illustrated in FIG. 3, at step 302, one or more of the systems described herein may identify a cloud-based service that provides remote software-services to client organizations. For example, identification module 104 may, as part of server 206 in FIG. 2, identify cloud-based service 208 that provides remote software-services to client organizations.

Identification module 104 may identify cloud-based service 208 in a variety of ways. In some embodiments, identification module 104 may identify the cloud-based service by searching a public page of a client organization. The public page of the client organization may contain a variety of information, including graphics, links to a subdomain of the cloud-based service, and/or other endorsements of the cloud-based service. Identification module 104 may accordingly identify cloud-based service 208 based on determining that the public page of the client organization contains one or more of these elements that represent a particular cloud-based service.

Additionally or alternatively, identification module 104 may determine that a particular client organization utilizes a particular cloud-based service by analyzing a public page of the cloud-based service for a variety of information, including graphics, links, and/or other endorsements from the client organization. In these examples, identification module 104 may identify cloud-based service 208 based on determining that the public page of the cloud-based service contains elements associating the client organization with the cloud-based service.

In some embodiments, identification module 104 may identify multiple cloud-based services for analysis. In these examples, identification module 104 may search for cloud-based services based on information from a client organization, such as an organization that subscribes to a risk analysis service that provides a list of cloud-based services to identification module 104.

Additionally or alternatively, identification module 104 may search for cloud-based services based on information gathered from a public page of the client organization, as described above. Identification module 104 may also examine public pages of previously identified cloud-based services that are not necessarily represented on the public page of the client organization. These previously identified cloud-based services may include cloud-based services that are represented by a previously compiled list of cloud-based services, services identified as part of performing risk analysis for other organizations that were then stored in a database, services identified through a web-based search, etc. As an example, the systems described herein may identify the cloud-based file storage service BOX.COM as part of calculating a risk score for an organization named FILECORP and record an entry for BOX.COM in a database of cloud-based services. At a later point in time, the systems described herein may identify the cloud-based services WORKDAY and SERVICE-NOW while examining a publicly-accessible page of an organization named BIGCOM as part of calculating a risk score for BIGCOM. While BOX.COM may not be represented on BIGCOM's publicly accessible page, the systems described herein may nevertheless examine publicly accessible pages of BOX.COM based on BOX.COM being represented in the database of cloud-based services.

Figure 4:
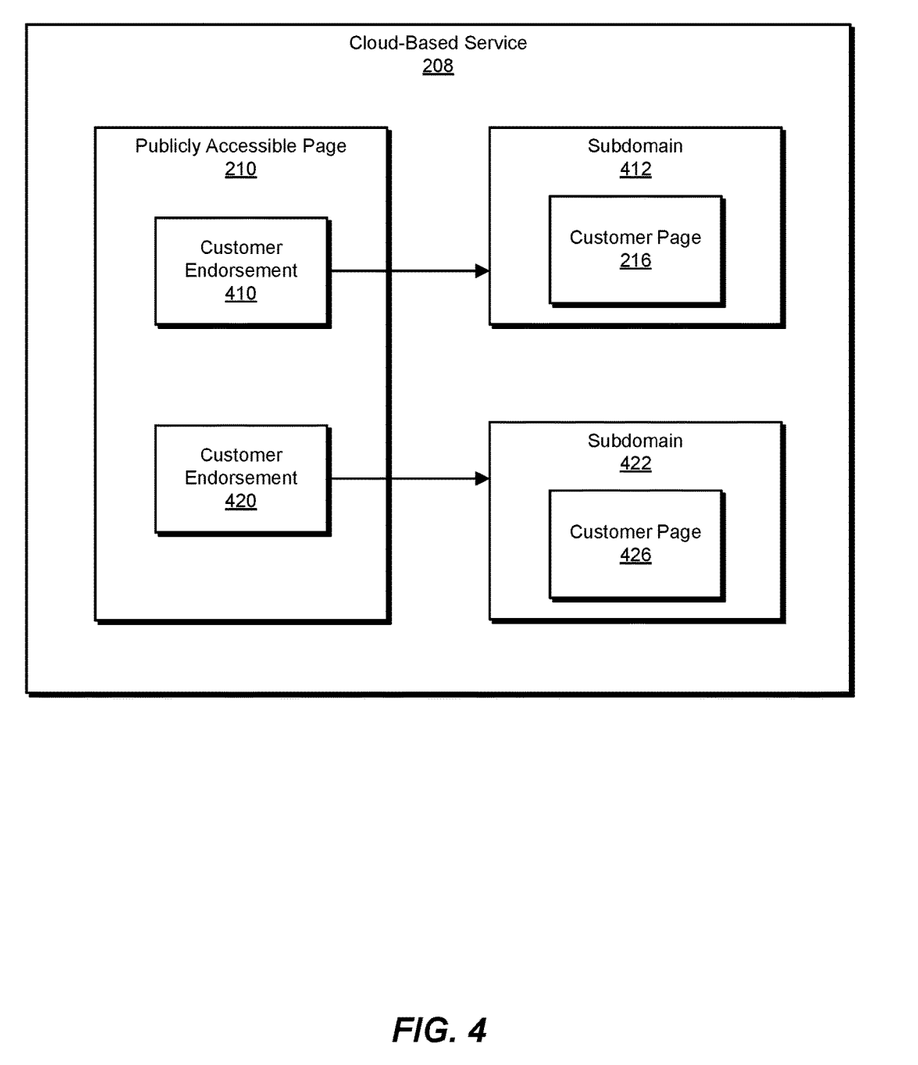
FIG. 4 is a block diagram of an example cloud-based service that hosts customer pages for various customers of the cloud-based service.

An example cloud-based service that hosts customer-specific pages is illustrated in FIG. 4. As shown, cloud-based service 208 may host publicly accessible page 210, which may contain a variety of endorsements from customers of cloud-based service 208. In the example of FIG. 4, publicly accessible page 210 contains customer endorsements 410 and 420. These customer endorsements may contain links to various subdomains of cloud-based service 208. Each subdomain of cloud-based service may specifically serve the customer indicated by the corresponding customer endorsement and host a corresponding customer page. In the example of FIG. 4, customer endorsement 410 may link to a subdomain 412 that hosts customer page 216, while a separate customer endorsement such as customer endorsement 420 may link to a different subdomain, such as subdomain 422. Subdomain 422 may host customer page 426, which may serve the customer that provided customer endorsement 420.

At step 304 in FIG. 3, one or more of the systems described herein may extract, from a publicly accessible page of the cloud-based service, a list of customers that use the cloud-based service. For example, extracting module 106 may, as part of server 206 in FIG. 2, extract, from publicly accessible page 210 of the cloud-based service, list of customers 212 that use the cloud-based service.

Extracting module 106 may extract list of customers 222 from publicly accessible page 210 in a variety of contexts. In some embodiments, extracting module 106 may search a rendered view of publicly accessible page 210, such as a representation of publicly accessible page 210 as presented by a browser window. Additionally or alternatively, extracting module 106 may search source code (e.g., Hypertext Markup Language/HTML code, JavaScript code, etc.) of customer page 216 for information describing customers of the cloud-based service.

Regardless of context, extracting module 106 may use any appropriate textual or image-based analysis to examine various elements of publicly accessible page 210. For example, extracting module 106 may match portions of text on publicly accessible page 210 to entries in a predetermined list of names of organizations. As an additional example, extracting module 106 may compare image files extracted from publicly accessible page 210 to previously identified logos of various organizations. Extracting module 106 may then assemble the names of organizations identified on publicly accessible page into list of customers 222.

Returning to FIG. 3 at step 306, one or more of the systems described herein may retrieve, for each customer in the list of customers, at least one link to a customer page on the cloud-based service that represents a method for the customer to access the remote software-services offered by the cloud-based service. For example, retrieving module 108 may, as part of server 206 in FIG. 2, retrieve, for each customer 214 in list of customers 212, at least one link to customer page 216 on cloud-based service 208 that represents a method for customer 214 to access the remote software-services offered by the cloud-based service.

Retrieving module 108 may identify and retrieve the link to publicly accessible page 210 in a variety of ways. In some examples, retrieving module 108 may retrieve the link to the customer page by identifying an organization-specific subdomain of the cloud-based service. Many services and/or organizations generate links to customer pages in predictable ways. For example, an organization named BIGCOM may utilize the cloud-based HR service, WORKDAY. Links to customer pages on WORKDAY generally follow a predictable pattern, and so retrieving module 108 may check if a Uniform Resource Locator (URL) such as "http://www.workday.com/customers/BIGCOM.php" exists. If an attempt to access the URL returns an HTML 200 status code (request succeeded), then retrieving module 108 may use the derived URL as the link to customer page 216. Retrieving module 108 may also check the validity of other URLs that follow other established patterns in an attempt to identify additional pages relating to the customer on the cloud-based service.

Additionally or alternatively, one or more of the graphic objects, text blocks, or other features used by identification module 104 to identify the cloud-based service may contain and/or otherwise be associated with a URL that links to customer page 216. For example, an image-based endorsement on an organization's webpage may also contain a link to customer page 216. In other words, a user browsing the organization's webpage may be able to click on the image-based endorsement and/or a text link to reach customer page 216. Retrieving module 108 may retrieve this link for use as the link to customer page 216.

In some cases, retrieving module 108 may retrieve a link that redirects to another link. In these cases, retrieving module 108 may follow all applicable redirections before using the final link as the link to customer page 216. For example, BIGCOM may use a URL shortening service to produce a shortened link for display on their publicly accessible page that lists cloud-based services used by BIGCOM. This shortened link may redirect users to a permanent link to BIGCOM's customer page. Retrieving module 108 may use this resolved URL as the link to customer page 216 rather than the shortened link. Naturally, retrieving module 108 may follow redirects as many times as is necessary to successfully identify the correct link to customer page 216.

At step 308 in FIG. 3, one or more of the systems described herein may analyze each identified customer page for at least one risk factor. For example, analyzing module 110 may, as part of server 206 in FIG. 2, analyze each identified customer page 216 for risk factor 218.

Analyzing module 110 may analyze various portions of customer page 216 for risk factors. For example, analyzing module 110 may analyze the customer page for risk factors by retrieving a hypertext transfer protocol (HTTP) header associated with the customer page and analyzing the HTTP header for risk factors. Additionally or alternatively, analyzing module 110 may analyze a rendered view of publicly accessible page 210, such as a representation of publicly accessible page 210 as presented by a browser window. furthermore, analyzing module 110 may analyze source code (e.g., Hypertext Markup Language/HTML code, JavaScript code, etc.) of customer page 216 for risk factors.

Analyzing module 110 may search customer page 216 for a variety of risk factors. For example, analyzing module 110 may search customer page 216 for a telephone number, an e-mail address, a link to an additional customer page that represents an additional method for the customer to access additional remote software-services offered by the cloud-based service, a link to an alternate customer page on an additional cloud-based service, information that has been determined to be sensitive by the customer associated with the customer page, and/or a form of encryption used by the customer page. Specifically, analyzing module 110 may search customer page 216 for elements that reveal information about customer 214, such as employee phone numbers, employee e-mail addresses, links to improperly secured private pages, links to sensitive data, and/or links to other customer pages relating to customer 214. Analyzing module 110 may also search for factors that may allow malicious parties to gain illicit access to private information about customer 214, such as customer page 216 using an obsolete and/or weak form of encryption to deliver data to end users.

In some embodiments, analyzing module 110 may assign a risk weight to each discovered risk factor. For example, analyzing module 110 may identify a form of encryption used by customer page 216. If customer page 216 uses a strong form of encryption, then analyzing module 110 may assign a weight corresponding to a lower risk level than if customer page 216 were to use a weak or even no form of encryption. The risk weights for each risk factor may later be used as part of calculating an overall risk score, as will be described in greater detail below.

At step 310, one or more of the systems described herein may calculate, based on the analysis, a risk score for the service that represents an overall estimation of security risks to client organizations that utilize the cloud-based service. For example, calculating module 112 may, as part of server 206 in FIG. 2, calculate, based on the analysis, risk score 220 for the service that represents an overall estimation of security risks to client organizations that utilize the cloud-based service.

Calculating module 112 may calculate risk scores in a variety of contexts. In some embodiments, calculating module 112 may calculate a risk score for a cloud-based service that represents how likely that particular cloud-based service is to leak sensitive data. In such embodiments, calculating module 112 may account for risk factors on many different publicly accessible pages owned by many different organizations that utilize the cloud-based service. As a specific example, many different organizations may use the cloud-based service, BOX.COM, which may maintain different publicly accessible pages and different customer pages for each customer. Calculating module 112 may account for risk factors extracted from each of these identified pages when calculating a risk score for BOX.COM.

Additionally or alternatively, calculating module 112 may calculate a risk score for an organization that represents an overall level of risk to sensitive data owned by the organization across multiple cloud-based services. For example, the systems described herein may, for a particular customer of a cloud-based service, identify additional cloud-based services that provide additional remote software-services to the customer. The systems described herein may then, for each identified additional cloud-based service, analyze additional customer pages that represent methods for the customer to access the additional remote software-services offered by the additional cloud-based services. Finally, calculating module 112 may calculate a unified customer risk score for the customer that represents an overall estimation of security risks to the customer across each of the cloud-based services. This unified risk score may be based on a variety of factors, such as the combination of the total quantity of risk factors identified on customer pages associated with the customer and/or the number of cloud-based services that host at least one customer page associated with the customer.

Figure 5:
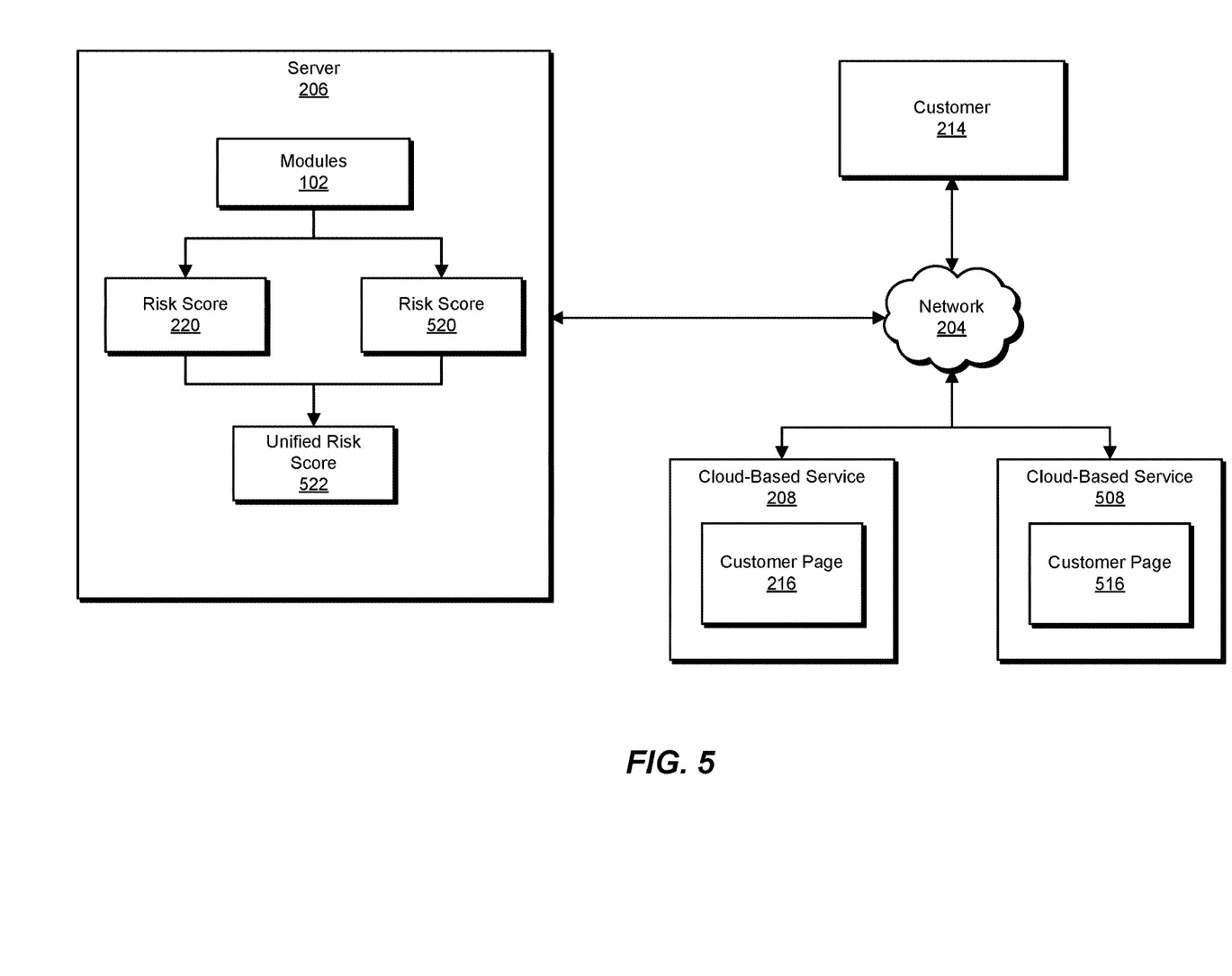
FIG. 5 is a block diagram of an example computing system for determining the risk of information leaks from cloud-based services.

An illustrated example of an example system that calculates unified risk scores for customers is provided in connection with FIG. 5. As illustrated in FIG. 5, server 206 may execute modules 102, which may utilize information from customer 214 and/or a publicly accessible page managed by customer 214 in order to identify cloud-based services 208 and 508. As described in greater detail above, one or more of modules 102 may identify links to customer pages 216 and 516 that are both associated with customer 214, then extract and analyze risk factors from each identified customer page. Calculating module 112 may then, as part of modules 102 in FIG. 5, calculate risk scores 220 and 520 for customer pages 216 and 516, respectively. Calculating module 112 may use risk score 220 as part of calculating a unified risk score for cloud-based service 208 in combination with risk scores for other customer pages found on cloud-based service 208, and similarly use risk score 520 as part of calculating a unified risk score for cloud-based service 208. Calculating module 112 may also combine risk score 220 and risk score 520 as part of calculating unified risk score 522 for customer 214, as illustrated in FIG. 5.

Calculating module 112 may calculate these risk scores in a variety of ways. In examples where calculating module 112 is calculating a risk score for a cloud-based service, calculating module 112 may base the risk score on factors such as the volume of sensitive data discovered on publicly accessible pages of cloud-based service 208, the number of customer pages and/or publicly accessible pages that contain risk factors, the risk weights for each risk factor identified, and/or any other suitable information about cloud-based service 208. In examples where calculating module 112 is calculating a risk score for a customer organization, calculating module 112 may base the risk score on factors such as the volume of sensitive data owned by the customer found on various cloud-based services, the number of cloud-based services that reveal information about the customer, the number of pages associated with the customer that contain risk factors, the risk weights for each risk factor identified, and/or any other suitable information about the customer organization.

The systems and methods described herein may include a number of additional features to assist administrators identify potentially problematic areas of online presence. In one embodiment, the systems described herein may, at a subsequent point in time after performing the first analysis, repeat retrieving links to customer pages on the cloud-based service, perform a subsequent analysis of each identified customer page for risk factors, and update the risk score for the service based on the subsequent analysis. In other words, one or more of modules 102 may periodically scan and analyze public pages of cloud-based services and/or customer organizations of those services in order to track risk factors over time. In some examples, a providing module (not illustrated) may compile this information gathered over time into a report, and provide the report to an administrator of the cloud-based service and/or an administrator of the customer organization. This report may contain a variety of information, such as a listing of pages and/or cloud-based services sorted by risk scores associated with each page and/or cloud-based service, information that identifies which risk factors were present on which pages, and/or a unified risk score for a cloud-based service and/or a customer organization.

In some embodiments, the systems described herein may include a security module (not illustrated) that may take steps to protect a customer's sensitive data. For example, the security module may, based on a risk score for a cloud-based service satisfying a predetermined threshold, notify an administrator of the cloud-based service that the risk score satisfied the predetermined threshold and/or prevent access to at least one customer page on the cloud-based service. Additionally or alternatively, the security module may, based on a risk score for a customer and/or a customer page satisfying a predetermined threshold, notify an administrator of the customer organization and/or prevent access to at least one customer page that is associated with the customer organization. For example, the security module may (A) prompt the cloud-based service that hosts the customer page to deny access to the customer page until further notice and (B) notify administrators of the cloud-based service and the customer organization that access to the customer page has been temporarily disabled.

As described in greater detail above, the systems and methods described herein may assist administrators in identifying and addressing potential leaks of sensitive data by periodically scanning and analyzing publicly available information on cloud-based services. The systems and methods described herein may further streamline the evaluation of potential information leaks by calculating risk scores for various customer-related pages, as well as unified risk scores for customers and services alike.

Figure 6:
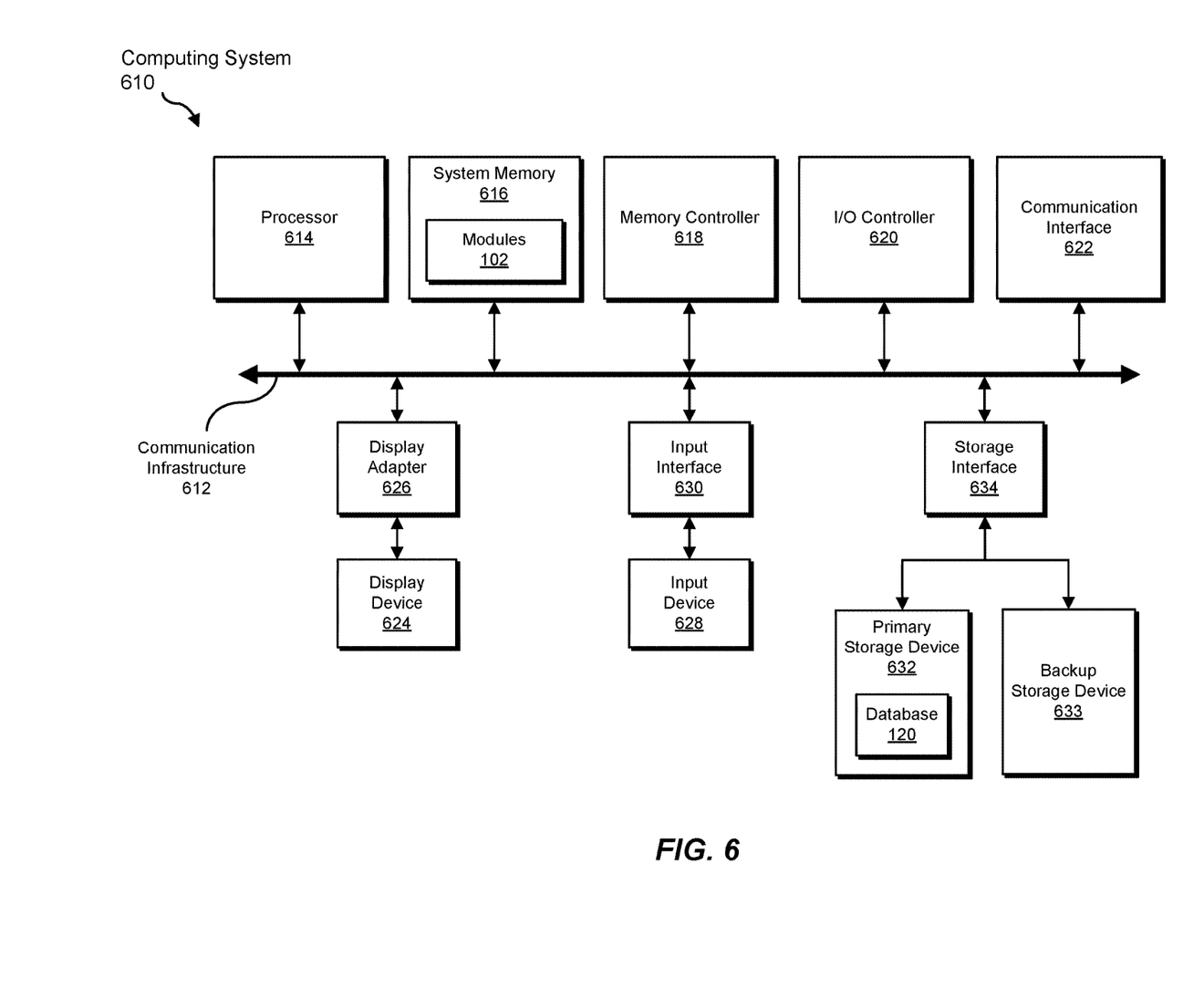
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to communication infrastructure 612 via an input interface 630. Input device 628 generally represents any type or form of input device capable of providing input, either computer or human generated, to example computing system 610. Examples of input device 628 include, without limitation, a keyboard, a pointing device, a speech recognition device, or any other input device.

As illustrated in FIG. 6, computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the embodiments described and/or illustrated herein. Additionally or alternatively, one or more of the embodiments described and/or illustrated herein may be implemented in firmware and/or hardware. For example, computing system 610 may be configured as an Application Specific Integrated Circuit (ASIC) adapted to implement one or more of the embodiments disclosed herein.

Figure 7:
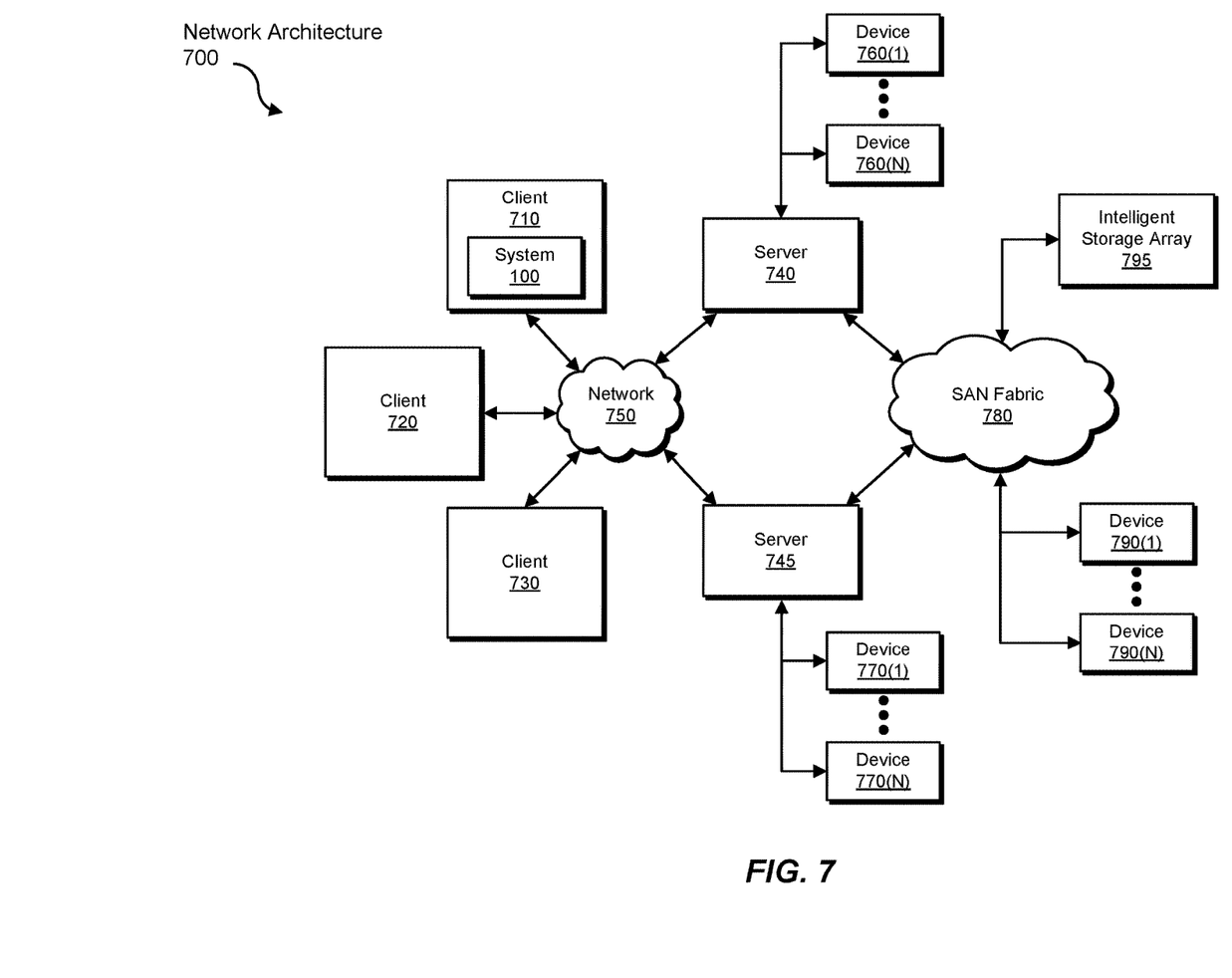
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for determining the risk of information leaks from cloud-based services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples in nature since many other architectures can be implemented to achieve the same functionality.

In some examples, all or a portion of system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various methods described and/or illustrated herein may also omit one or more of the steps described or illustrated herein or include additional steps in addition to those disclosed.

While various embodiments have been described and/or illustrated herein in the context of fully functional computing systems, one or more of these embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the embodiments disclosed herein.

In addition, one or more of the modules described herein may transform data, physical devices, and/or representations of physical devices from one form to another. For example, one or more of the modules described herein may receive a list of cloud-based services to analyze, use the list of services to identify publicly accessible pages for each cloud-based service, extract customer listings from each publicly accessible page, transform the extracted customer listings into a collection of customer pages that correspond to the identified customers, analyze the customer pages for risk factors, use a result of the analysis to calculate risk scores for the cloud-based services, use a result of the analysis to calculate risk scores for the customer organizations, output a result of the analysis to a database, and/or provide a result of the analysis to an administrator and/or software security system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the embodiments disclosed herein. This description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining the risk of information leaks from cloud-based services, at least a portion of the method being performed by a computing device comprising at least one processor, the method comprising:
    identifying a cloud-based service that provides remote software-services to client organizations;
    extracting, from a publicly accessible page of the cloud-based service, a list of customers that use the cloud-based service;
    retrieving, for each customer in the list of customers, at least one link to a customer page on the cloud-based service that represents a method for the customer to access the remote software-services offered by the cloud-based service;
    analyzing each identified customer page for at least one risk factor;
    calculating, based on the analysis, a risk score for the service that represents an overall estimation of security risks to client organizations that utilize the cloud-based service.

2. The method of claim 1, wherein analyzing the customer page for risk factors comprises determining that the customer page comprises at least one of:
    a telephone number;
    an e-mail address;
    a link to an additional customer page that represents an additional method for the customer to access additional remote software-services offered by the cloud-based service;
    a link to an alternate customer page on an additional cloud-based service;
    information that has been determined to be sensitive by the customer associated with the customer page;
    a form of encryption used by the customer page.

3. The method of claim 1, wherein analyzing the customer page for risk factors comprises:
    retrieving a hypertext transfer protocol (HTTP) header associated with the customer page;

analyzing the hypertext transfer protocol header for risk factors.

4. The method of claim 1, wherein retrieving the link to the customer page comprises identifying an organization-specific subdomain of the cloud-based service.

5. The method of claim 1, further comprising, at a subsequent point in time:
  retrieving, for each customer in the list of customers, links to customer pages on the cloud-based service;
  performing a subsequent analysis of each retrieved customer page for risk factors;
  updating, based on the subsequent analysis, the risk score for the service.

6. The method of claim 1, wherein identifying the cloud-based service comprises:
  searching a public page of a client organization;
  determining that the public page of the client organization comprises at least one of:
    a link to a subdomain of the cloud-based service;
    an endorsement of the cloud-based service.

7. The method of claim 1, further comprising, for a particular customer of the cloud-based service:
  identifying additional cloud-based services that provide additional remote software-services to the customer;
  for each identified additional cloud-based service, analyzing additional customer pages that represents methods for the customer to access the additional remote software-services offered by the additional cloud-based services;
  calculating, for the customer of the cloud-based services, a unified customer risk score that represents an overall estimation of security risks to the customer across each of the cloud-based services.

8. The method of claim 7, wherein the unified customer risk score is based on a combination of:
  the total quantity of risk factors identified on customer pages associated with the customer;
  the number of cloud-based services that host at least one customer page associated with the customer.

9. The method of claim 1, further comprising performing, based on the risk score satisfying a predetermined threshold, a security action comprising at least one of:
  notifying an administrator of the cloud-based service that the risk score satisfied the predetermined threshold;
  preventing access to at least one customer page on the cloud-based service.

10. A system for determining the risk of information leaks from cloud-based services, the system comprising:
  an identification module, stored in memory, that identifies a cloud-based service that provides remote software services to client organization;
  an extracting module, stored in memory, that extracts, from a publicly accessible page of the cloud-based service, a list of customers that use the cloud-based service;
  a retrieving module, stored in memory, that retrieves, for each customer in the list of customers, at least one link to a customer page on the cloud-based service that represents a method for the customer to access remote software-services offered by the cloud-based service;
  an analyzing module, stored in memory, that analyzes each identified customer page for at least one risk factor;
  a calculating module, stored in memory, that calculates, based on the analysis, a risk score for the service that represents an overall estimation of security risks to client organizations that utilize the cloud-based service;
  at least one processor that executes the identification module, the extracting module, the retrieving module, the analyzing module, and the calculating module.

11. The system of claim 10, wherein the analyzing module analyzes the customer page for risk factors by determining that the customer page comprises at least one of:
  a telephone number;
  an e-mail address;
  a link to an additional customer page that represents an additional method for the customer to access additional remote software-services offered by the cloud-based service;
  a link to an alternate customer page on an additional cloud-based service;
  information that has been determined to be sensitive by the customer associated with the customer page;
  a form of encryption used by the customer page.

12. The system of claim 10, wherein the analyzing module analyzes the customer page for risk factors by:
  retrieving a hypertext transfer protocol (HTTP) header associated with the customer page;
  analyzing the hypertext transfer protocol header for risk factors.

13. The system of claim 10, wherein the retrieving module retrieves the link to the customer page by identifying an organization-specific subdomain of the cloud-based service.

14. The system of claim 10, wherein, at a subsequent point in time:
  the retrieving module retrieves, for each customer in the list of customers, links to customer pages on the cloud-based service;
  the analyzing module performs a subsequent analysis of each retrieved customer page for risk factors;
  the calculating module updates, based on the subsequent analysis, the risk score for the service.

15. The system of claim 10, wherein the identification module identifies the cloud-based service by:
  searching a public page of a client organization;
  determining that the public page of the client organization comprises at least one of:
    a link to a subdomain of the cloud-based service;
    an endorsement of the cloud-based service.

16. The system of claim 10, wherein:
  the identification module identifies additional cloud-based services that provide additional remote software-services to the customer;
  the analyzing module analyzes, for each identified additional cloud-based service, additional customer pages that represent methods for the customer to access the additional remote software-services offered by the additional cloud-based services;
  the calculating module calculates, for the customer of the cloud-based services, a unified customer risk score that represents an overall estimation of security risks to the customer across each of the cloud-based services.

17. The system of claim 16, wherein the calculating module calculates the unified risk score based on a combination of:
  the total quantity of risk factors identified on customer pages associated with the customer;
  the number of cloud-based services that host at least one customer page associated with the customer.

18. The system of claim 10, further comprising a security module, stored in memory, that performs, based on the risk score satisfying a predetermined threshold, a security action comprising at least one of:

notifying an administrator of the cloud-based service that the risk score satisfied the predetermined threshold;

preventing access to at least one customer page on the cloud-based service.

19. A non-transitory computer-readable medium comprising one or more computer-executable instructions that, when executed by at least one processor of a computing device, cause the computing device to:

identify a cloud-based service that provides remote software-services to client organizations;

extract, from a publicly accessible page of the cloud-based service, a list of customers that use the cloud-based service;

retrieve, for each customer in the list of customers, at least one link to a customer page on the cloud-based service that represents a method for the customer to access the remote software-services offered by the cloud-based service;

analyze each identified customer page for at least one risk factor;

calculate, based on the analysis, a risk score for the service that represents an overall estimation of security risks to client organizations that utilize the cloud-based service.

20. The non-transitory computer-readable medium of claim 19, wherein the one or more computer-readable instructions cause the computing device to analyze the customer page for risk factors by determining that the customer page comprises at least one of:

a telephone number;

an e-mail address;

a link to an additional customer page that represents an additional method for the customer to access additional remote software-services offered by the cloud-based service;

a link to an alternate customer page on an additional cloud-based service;

information that has been determined to be sensitive by the customer associated with the customer page;

a form of encryption used by the customer page.

* * * * *